(12) United States Patent
Gupta et al.

(10) Patent No.: US 11,151,037 B2
(45) Date of Patent: Oct. 19, 2021

(54) USING TRACK LOCKS AND STRIDE GROUP LOCKS TO MANAGE CACHE OPERATIONS

(71) Applicant: INTERNATIONAL BUSINESS MACHINES CORPORATION, Armonk, NY (US)

(72) Inventors: Lokesh M. Gupta, Tucson, AZ (US); Matthew G. Borlick, Tucson, AZ (US); Kevin J. Ash, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 15/951,168

(22) Filed: Apr. 12, 2018

(65) Prior Publication Data
US 2019/0317898 A1 Oct. 17, 2019

(51) Int. Cl.
*G06F 12/0815* (2016.01)
*G06F 12/14* (2006.01)
*G06F 11/10* (2006.01)
*G06F 13/16* (2006.01)

(52) U.S. Cl.
CPC ...... *G06F 12/0815* (2013.01); *G06F 11/1004* (2013.01); *G06F 12/1466* (2013.01); *G06F 13/1668* (2013.01); *G06F 2212/1032* (2013.01)

(58) Field of Classification Search
None
See application file for complete search history.

(56) References Cited

U.S. PATENT DOCUMENTS

| 4,354,232 | A | * | 10/1982 | Ryan | G06F 12/0855 365/189.05 |
| 5,922,057 | A | | 7/1999 | Holt | |
| 6,385,683 | B1 | | 5/2002 | DeKoning et al. | |
| 6,463,503 | B1 | | 10/2002 | Jones et al. | |

(Continued)

FOREIGN PATENT DOCUMENTS

| CN | 101566977 A | 10/2009 |
| CN | 104508645 A | 4/2015 |

(Continued)

OTHER PUBLICATIONS

Office Action dated Aug. 12, 2019, pp. 18, for U.S. Appl. No. 15/965,319.

(Continued)

*Primary Examiner* — Charles J Choi
(74) *Attorney, Agent, or Firm* — David W. Victor; Konrad Raynes Davda & Victor LLP

(57) ABSTRACT

Provided are a computer program product, system, and method for using track locks and stride group locks to manage cache operations. A group of tracks from the storage devices are stored in a cache. Exclusive track locks for tracks in the group in the cache are granted for writes to the tracks in the group in the cache, wherein exclusive track locks can be simultaneously held for writes to different tracks in the cache. An exclusive group lock for the group of tracks in the cache is granted to destage the tracks in the group from the cache to the storage devices. The exclusive group lock is released in response to completing the destage of the tracks in the group in the cache to the storage devices.

25 Claims, 6 Drawing Sheets

Stride Group Locks

(56) References Cited

U.S. PATENT DOCUMENTS

| | | | |
|---|---|---|---|
| 6,643,737 B1* | 11/2003 | Ono | G06F 12/126 |
| | | | 711/128 |
| 6,934,318 B2 | 8/2005 | Sarkar | |
| 8,392,800 B2 | 3/2013 | Etkin | |
| 8,719,645 B2 | 5/2014 | Chiu et al. | |
| 8,762,609 B1 | 6/2014 | Lam et al. | |
| 9,116,858 B1 | 8/2015 | Yokoi et al. | |
| 9,304,689 B2 | 4/2016 | Guo et al. | |
| 9,384,093 B1 | 7/2016 | Aiello | |
| 9,542,344 B2 | 1/2017 | Tuers et al. | |
| 9,563,382 B2 | 2/2017 | Hahn et al. | |
| 9,720,601 B2 | 8/2017 | Gupta et al. | |
| 2001/0002480 A1* | 5/2001 | Dekoning | G06F 3/0626 |
| | | | 711/130 |
| 2001/0028520 A1 | 10/2001 | Amada et al. | |
| 2003/0016596 A1 | 1/2003 | Chiquoine et al. | |
| 2005/0022097 A1 | 1/2005 | Cheng | |
| 2005/0278607 A1 | 12/2005 | Garodnick | |
| 2006/0036901 A1 | 2/2006 | Yang et al. | |
| 2009/0172244 A1 | 7/2009 | Wang et al. | |
| 2012/0230104 A1 | 9/2012 | Kim et al. | |
| 2013/0013857 A1 | 1/2013 | Dawkins et al. | |
| 2015/0286419 A1 | 10/2015 | Guo et al. | |
| 2016/0054942 A1 | 2/2016 | Yu et al. | |
| 2016/0110283 A1* | 4/2016 | Iyigun | G06F 12/0842 |
| | | | 711/130 |
| 2016/0328301 A1* | 11/2016 | Parakh | G06F 11/1446 |
| 2017/0031596 A1 | 2/2017 | Galbraith et al. | |
| 2017/0097886 A1* | 4/2017 | Banerjee | G06F 12/0868 |
| 2017/0103016 A1 | 4/2017 | Stalzer | |
| 2017/0139594 A1 | 5/2017 | Ahn et al. | |
| 2017/0139823 A1 | 5/2017 | Tomlin et al. | |
| 2017/0139825 A1 | 5/2017 | Dubeyko et al. | |
| 2017/0249222 A1 | 8/2017 | Patnaik et al. | |
| 2017/0322845 A1 | 11/2017 | Nomura et al. | |
| 2017/0329541 A1 | 11/2017 | Hayasaka et al. | |
| 2018/0011527 A1 | 1/2018 | Kim | |
| 2018/0364949 A1 | 12/2018 | Aston et al. | |
| 2019/0332470 A1 | 10/2019 | Gupta et al. | |
| 2019/0332471 A1 | 10/2019 | Gupta et al. | |

FOREIGN PATENT DOCUMENTS

| | | |
|---|---|---|
| CN | 106790599 A | 5/2017 |
| EP | 1452967 | 9/2004 |
| EP | 1188119 | 12/2009 |
| WO | 2017081593 | 5/2017 |
| WO | 2018004836 | 1/2018 |

OTHER PUBLICATIONS

U.S. Appl. No. 15/965,268, filed Apr. 27, 2018.
U.S. Appl. No. 15/965,319, filed Apr. 27, 2018.
List of IBM Patents or Patent Applications Treated as Related, dated Aug. 16, 2019, pp. 2.
PCT International Search Report and Written Opinion dated Aug. 20, 2019, pp. 9, for application No. PCT/IB2019/052653.
English translation of CN101566977A.
English translation of CN104508645A.
English translation of CN106790599A.
Office Action dated Sep. 11, 2019, pp. 20, for U.S. Appl. No. 15/965,268, filed Apr. 27, 2018.
Response dated Dec. 11, 2019, pp. 9, to Office Action dated Sep. 11, 2019, pp. 20, for U.S. Appl. No. 15/965,268.
Notice of Allowance dated Jan. 10, 2020, pp. 13, for U.S. Appl. No. 15/965,268.
Agarwal, N., et al., "Design Tradeoffs for ssd Performance", [online], translated on Apr. 25, 2008, [Retrieved on Jan. 21, 2018], Retrieved from the Internet at URL: <https://www.usenix.org/legacy/event/usenix08/tech/full_papers/agrawa . . . , 22 pp.
Cobb, D., "NVM Express and the PCI Express SSD Revolution", Intel Developer Forum 2012, © 2012 Intel Corporation, 48 pp.
Evans, C., "Does NVMe Signal the End of the Storage Controller?", [online], Aug. 15, 2017, [Retrieved on Mar. 19, 2018], Retrieved from the Internet at URL: <http://www.computerweekly.com/feature/Does-NVMe-signal-the-end-of-t . . . >, 2 pp.
Marks, K., "An NVM Express Tutorial", Flash Memory Summit 2013, 92 pp.
Disclosed Anonymously, "Method for Enhanced Application Performance and Improved Loadbalancing Considerations in Multi-tier Storage Environment", Ip.Com No. IPCOM000250728D, Aug. 29, 2017, 7 pp.
Metz, J., "Under the Hood with NVMe Over Fabrics", Interop Expo Las Vegas, May 2016, 44 pp.
NVM Express, "NVM Express", Revision 1.3a, Oct. 24, 2017, 287 pp. (Submitted in 2 uploads PartA and PartB to size limit).
NVM Express, "NVM Product Overview", [online], © 2018 NVM Express, Inc., [Retrieved on Mar. 19, 2018], Retrieved from the Internet at URL: <https://nvmexpress.org/about/nvm-express-overview/>, 2 pp.
Son, Y., et al., "An Empirical Evaluation of NVM Express SSD", 2015 International Conference on Cloud and Autonomic Computing, 8 pp.
Zhang, G., et al., "Adaptive Data Migration in Multi-tiered Storage Based Cloud Environment", 2010 IEEE 3rd International Conference on Cloud Computing, 8 pp.
Response dated Nov. 12, 2019, pp. 11, to Office Action dated Aug. 12, 2019, pp. 18, for U.S. Appl. No. 15/965,319.
Notive of Allowance dated Dec. 3, 2019, pp. 13, for U.S. Appl. No. 15/965,319.
UK Exam Report dated Nov. 19, 2020, pp. 4, for Application No. GB2017405.8.
Reply dated Mar. 9, 2021, pp. 1, to UK Exam Report dated Nov. 19, 2020, pp. 4, for Application No. GB2017405.8.

* cited by examiner

USING TRACK LOCKS AND STRIDE GROUP LOCKS TO MANAGE CACHE OPERATIONS

BACKGROUND OF THE INVENTION

1. Field of the Invention

The present invention relates to a computer program product, system, and method for using track locks and stride group locks to manage cache operations.

2. Description of the Related Art

A storage controller maintains one or more device adaptors to interface with an array of storages devices, such as storage devices a Redundant Array of Independent Disks (RAID) array. The device adaptors manage requests to the connected storage devices and implement the RAID controller and functions for the storage controller. In Nonvolatile Memory Express (NVMe), NVMe controllers may access read and write requests to the storage devices in submission queues in a host system and include RAID functionality to stripe data across storage devices, such as Solid State Drives (SSDs).

There is a need in the art for improved technologies for writing and reading data across an array of storage devices, such as a RAID array, in environments where multiple processor cores are reading and writing to tracks in stride groups in the cache that are stored in the storage devices.

SUMMARY

A first embodiment provides a computer program product, system, and method for using track locks and stride group locks to manage cache operations. A group of tracks from the storage devices are stored in a cache. Exclusive track locks for tracks in the group in the cache are granted for writes to the tracks in the group in the cache, wherein exclusive track locks can be simultaneously held for writes to different tracks in the cache. An exclusive group lock for the group of tracks in the cache is granted to destage the tracks in the group from the cache to the storage devices. The exclusive group lock is released in response to completing the destage of the tracks in the group in the cache to the storage devices.

The first embodiment provides improvements to computer technology to allow multiple exclusive track locks for writes to be simultaneously held to allow writes to different tracks in the cache. Further, an exclusive group lock is granted for a group of tracks for a destage of the group of tracks. Different processes trying to access the tracks subject to being destaged are blocked while the exclusive group lock is held for a destage process. The releasing of the exclusive group lock for the destage allows the exclusive track locks to be granted for concurrent writes to the tracks in the group. In this way, the described embodiments provide improvements to manage and allow simultaneous writes to different tracks in a group of tracks, such as a stride group, and at the same time provide for locking of all the tracks in the group for a destage operation.

A second embodiment may optionally further include receiving a write to a target track in the group, determining whether the exclusive group lock for the group is held, granting an exclusive track lock to the target track in response to determining that the exclusive group lock is not held, and retrying to access the exclusive track lock for the target track in response to determining that the exclusive group lock is held.

With the second embodiment, a write to a target track is only granted if the exclusive group lock is not held for a destage operation to prevent writes from writing to tracks involved in an ongoing destaging operations. This provides improvements for coordinating simultaneous writes to different tracks in a group of tracks with destaging operations to the group of tracks to destage all the tracks in the group.

A third embodiment may optionally further include granting shared group locks for writes to the tracks in the group in the cache; releasing a shared group lock for a write in response to completing the write to a track in the cache; and determining whether any shared group locks are held in response to initiating the destage of the group of tracks, wherein the exclusive group lock is only granted in response to determining that there are no shared group locks held for the group to destage.

With the third embodiment, a shared group lock is granted to writes that are simultaneously writing to the tracks in the group to which the shared group lock applies. To further coordinate a destage operation while simultaneous writes are occurring, a shared group lock held by the writes prevents a destage operation from initiating until all the writes have completed, which is indicated by no shared group locks being held for the group of tracks to destage.

A fourth embodiment may optionally further include that the destage of the group of tracks further comprises: determining modified data in tracks in the group in the cache; generating a read request to add to a submission queue indicating data for the modified data and old parity data for the group to read from at least one of the storage devices to stage into the cache; calculating new parity data using the read data for the modified data and the old parity data staged into the cache; and writing the new parity data and the modified data in the cache to the at least one of the storage devices, wherein the exclusive group lock is released in response to completing of the writing of the new parity data and the modified data to the at least one of the storage devices.

The fourth embodiment provides improvements to calculating parity data for tracks in a group by generating a read request to read modified data and old parity data from the storage devices to stage into the cache and then use that staged data to calculate new parity data. The exclusive group lock is held by the destage operation while calculating the new parity data and is not released until the new parity data is calculated and written to the storage devices. This improves the coordination of the destaging operation with writes to the tracks by preventing writes until all the modified data for the tracks and the new parity data are destaged.

A fifth embodiment may optionally include that the writing the new parity data and the modified data comprises generating a write request to add to the submission queue indicating data for the modified data and the new parity data in the cache to transfer from the cache to the at least one of the storage devices.

With the fifth embodiment, a write request is added to the submission queue to write the modified data and the new parity data in the cache to transfer from the cache to the storage devices. This write request management is useful in systems that deploy a controller to access read and write requests from a submission queue, such as the case with NVMe controllers, so as to allow the controller to complete the reading and writing of the modified data and the parity data for a partial group destage operation, which only writes the modified data and the new parity data to the storage. In this way bandwidth between the controller and the system is optimized by only transferring the modified data and new parity data through the submission queue.

A sixth embodiment may optionally include that the generating the read request comprises: determining modified segments of tracks in the group; allocating cache segments in the cache for the determined modified segments and segments for old parity data; and generating a list indicating the segments for the modified data and the parity data and destination locations in the cache for the allocated cache segments, wherein the list is provided with the read request to use to determine the data to read from the at least one of the storage devices to write to the destination locations in the cache.

The sixth embodiment improves the efficiency of operations to stage segments for modified data and the parity data into the cache by generating a list indicating the segments for the modified data and the old parity data that is provided with a read request in the submission queue. A controller may access the submission queue to process the read request and the list to stage segments for the modified data and the old parity data into the cache to use to calculate new parity data. The controller, such as an NVMe controller, accesses the read request from a submission queue to stage in segments needed to calculate the new parity data. Described embodiments optimize the staging operations by only staging in the segments for modified data in the partial stride destage, not unmodified segments.

A seventh embodiment provides a computer program product, system, and method for managing Input/Output requests to a tracks in a cache stored in a plurality of storage devices by a plurality of processing cores executing program code in a computer readable storage medium to grant shared stride locks to writes to tracks in a stride group of tracks, wherein the shared stride locks are granted to writes simultaneously writing to different tracks in the stride group. A determination is made as to whether there are outstanding shared stride locks for writes in response to a destage request to destage the stride groups of tracks. An exclusive stride lock is granted for a destage of a stride group of tracks from the cache to the storage devices in response to determining there are no outstanding shared stride locks for writes.

The seventh embodiment provides improved caching technology when multiple processing cores are writing to tracks in a stride group by granting shared stride locks to processing cores simultaneously writing to different tracks in the stride group. A destage request cannot proceed until being granted an exclusive stride group lock, which cannot be granted unless there are not outstanding shared stride locks for writes. In this way, described embodiments provide improved technology for coordinating writes by multiple cores that may be simultaneously writing to the tracks in a stride group with a destage operation for the stride that requires exclusive access to all the tracks in the stride group.

DETAILED DESCRIPTION

Described embodiments provide cache lock management techniques to improve the management of reads and writes by multiple processor cores to tracks in stride groups that are striped across storage devices. In certain embodiments, a storage controller may not include device adaptors to handle RAID operations and may instead place reads and writes in submission queues that are accessed by a controller to read and write to the storage devices. The described embodiments provide for management of reads and writes to a cache by multiple processor cores, and for destaging of tracks in groups that are stored in an array of storage devices, such as stride groups striped across storage devices in a RAID array. The described embodiments provide exclusive track locks to allow for independent cores or processes to concurrently write to different tracks in a stride group and provide for exclusive and shared group locks to manage the destaging of tracks in a stride. A destage operation may only be allowed to proceed upon receiving an exclusive group lock that is granted when there are no other writers holding locks to the tracks in the stride group and that, once granted, prevents writes from writing to the stride group during destaging operations.

The described embodiments provide improvements in cache management technology in environments were a separate controller manages reads and writes between the cache and the storage devices. The described embodiments allow for writes to be granted locks to write to tracks in a stride group and to coordinate the allowing of writes to not proceed during the destaging of the stride group to be written across the storage devices.

Figure 1:
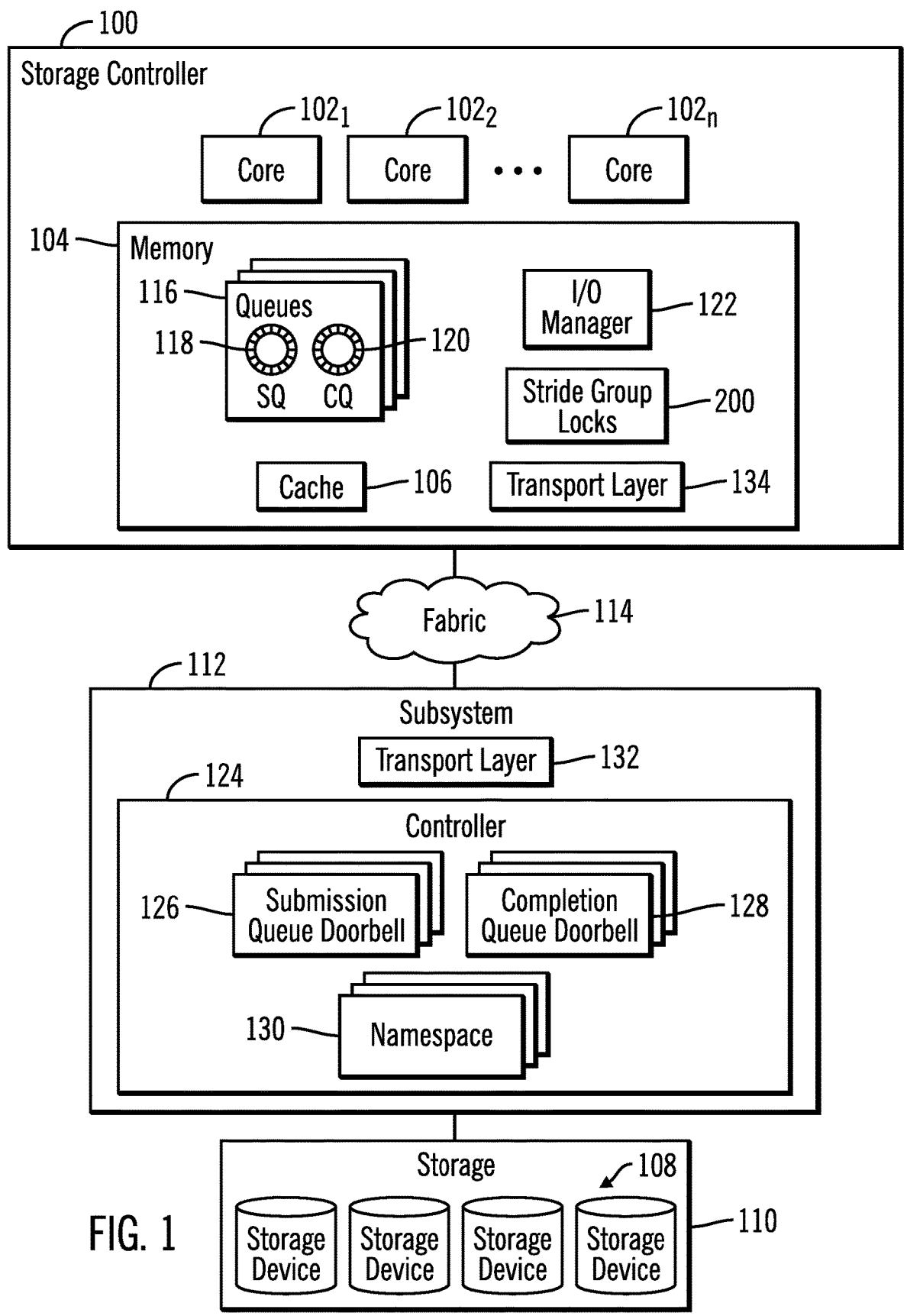
FIG. 1 illustrates an embodiment of a storage controller.

FIG. 1 illustrates an embodiment of a storage controller 100, or other type of system, including a plurality of cores $102_1, 102_2 \ldots 102_n$ and a memory 104 including a cache 106 to cache tracks staged from storage devices 108 in a storage array 110 to make available to read requests. The storage controller 100 is in communication with a subsystem 112 over a fabric 114, where read and write requests to the storage devices 108 are managed by the subsystem 112. The memory 104 includes queues 116, one for each of the cores $102_1, 102_2 \ldots 102_n$, where the queues 116 for each core include one or more submission queues (SQs) 118 to which read and write requests are added and a completion queue 120 (CQ). The queues 118, 120 may comprise circular queues each having a head pointer pointing to an end of the queue from which requests are accessed when the queue is processed and a tail pointer pointing to an end of the queue to which requests are added. A core $102_i$ executes an I/O manager 122 to add requests to the submission queues 118 for the core $102_i$ to stage tracks from the storage devices 108 to the cache 106 and destage tracks from the cache 106 to the storage devices 108.

A controller 124 in the subsystem 112 retrieves read and write requests to the storage devices 108 added to the submission queues 118 by the I/O manager 122 when the I/O manager 122 writes to a submission queue doorbell 126 in the controller 124. In response to completing the retrieved read or write request with respect to the storage devices 108, the controller 124 returns complete for the read or write request to the completion queue 120, which informs the core $102_1, 102_2 \ldots 102_n$ initiating the read or write request of the completion. The core $102_i$, executing the I/O manager 122, may write to a completion queue doorbell 128 to indicate completing processing the completion written to the completion queue 120 to coordinate the completion.

In Non-Volatile Memory Express (NVMe) embodiments, the controller 124 may comprise an NVMe controller and the I/O manager 122 may include NVMe drivers to interface with the NVMe controller 124, and implement the queues 116. The NVMe controller 124 may include submission queue doorbells 126, one for each of the submission queues used by a core $102_i$, and a completion queue doorbell 128. The core $102_i$ adding the request to its submission queue 118 writes to the controller 124 submission queue doorbell 126 to cause the controller 124 to access the read or write request added to the submission queue 118 associated with the written submission queue doorbell 126. The controller 124 may execute the fetched commands in any order. When the core $102_1$, $102_2$ . . . $102_n$ processes a completion of a read/write request indicated in the completion queue 120, the core $102_1$, $102_2$ . . . $102_n$ writes to the completion queue doorbell 128 for the completion queue 120. The controller 124 may support multiple namespaces 130 that comprise portions of non-volatile memory spaces implemented in the storage devices 108. The storage controller 100 may direct read and write requests to the namespaces 130 that map to non-volatile memory space in the storage devices 108. The storage devices 108 would further include hardware and software to interface with the NVMe controller 124.

The embodiment of FIG. 1 may implement NVMe over Fabrics, where the storage controller 100 and subsystem 112 communicate over a fabric 114. In such embodiments, the storage controller 100 and NVMe subsystem 112 include transport layers 132, 134 respectively to enable network communication, such as using Remote Direct Memory Access (RDMA), RDMA over Converged Ethernet (RoCE), Internet Wide-area RDMA Protocol (iWARP), InfiniBand, and Fibre Channel. In an alternative embodiment, the subsystem 112, such as an NVME subsystem 112 may be implemented in a Peripheral Component Interconnect Express (PCIe) card in the storage controller 100, and the storage controller 100 and NVMe subsystem 112 communicate over a PCIe interface.

The fabric 114 may comprise one or more networks including Local Area Networks (LAN), Storage Area Networks (SAN), Wide Area Network (WAN), peer-to-peer network, wireless network, the Internet, etc.

The storage controller 100 maintains Input/Output (I/O) manager code 122, executed by the cores $102_1$, $102_2$ . . . $102_n$, to stage and destage tracks from the storage devices 108 to the cache 106. The I/O manager code 122 may further implement Redundant Array of Independent Disk (RAID) algorithms, or other types of storage array management algorithms, to stripe tracks in stride groups onto the storage devices 108 and calculate parity for the tracks in a stride group to stripe with the tracks across the storage devices 108. The I/O manager 122 maintains stride group locks 200 for the stride groups configured in the storage devices 108 to manage reads, writes, stages and destages of tracks in stride groups being performed by the different cores $102_1$, $102_2$ . . . $102_n$ to avoid contention and maintain cache and destage coherency.

The cores $102_1$, $102_2$ . . . $102_n$ may comprise multiple cores on a same central processing unit (CPU)/integrated circuit substrate, or comprise separate processing units. Each core $102_1$, $102_2$ . . . $102_n$ may execute the I/O manager 122 code to submit read and writes to tracks configured in strides in the storage devices 108 that are maintained in cache 106 to stage tracks from the storage devices 108 and destage stride groups of tracks from the cache 106 to stripe across the storage devices.

The I/O manager 122 may maintain a track index providing an index of tracks in the cache 106 to cache control blocks in a control block directory. The control block directory includes cache control blocks, where there is one cache control block for each track in the cache 106 providing metadata on the track in the cache, such as stride group information on the stride group in which the track is maintained. The track index associates tracks with the cache control blocks providing information on the tracks in the cache 106.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices 108 in the storage array 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 108 in the storage array 110 may comprise heterogeneous storage devices from different vendors and different types of storage devices, such as a first type of storage devices, e.g., hard disk drives, that have a slower data transfer rate than a second type of storage devices, e.g., SSDs.

In NVMe implementations, the storage devices 108 would include NVMe components to interface with the NVMe subsystem 112, such as NVMe SSD devices.

The memory 104 may comprise a suitable system memory known in the art, including volatile and non-volatile memory devices, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc.

Figure 2:
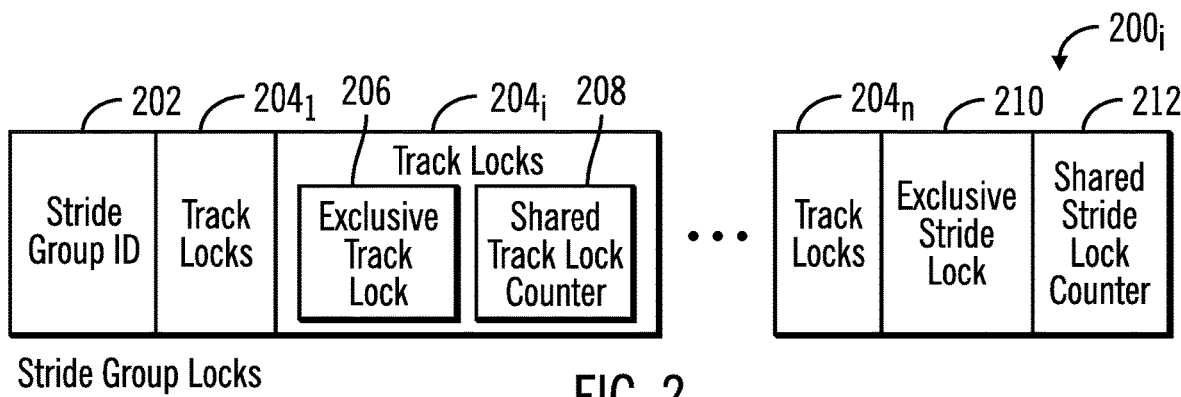
FIG. 2 illustrates an embodiment of track locks.

FIG. 2 illustrates an embodiments of an instance of stride group locks $200_i$ for one of the stride groups configured in the storage devices 108, including a stride group identifier (ID) 202 identifying a stride group; track locks $204_1$, $204_2$ . . . $204_n$ for each of the tracks in the stride group 202, where the track locks $204_i$ for each track in the stride group 202 includes an exclusive track lock 206 indicating whether an exclusive lock has been granted for the track and a shared track lock counter 208 indicating a number of shared track locks granted for the track; an exclusive stride lock 210 indicating that an exclusive lock to the stride group 202 has been granted; and a shared stride lock counter 212 indicating an number of shared stride locks that have been granted. The stride group lock $200_i$ information may further indicate the tracks in the stride group for which the locks $204_i$ are provided.

Figure 3:
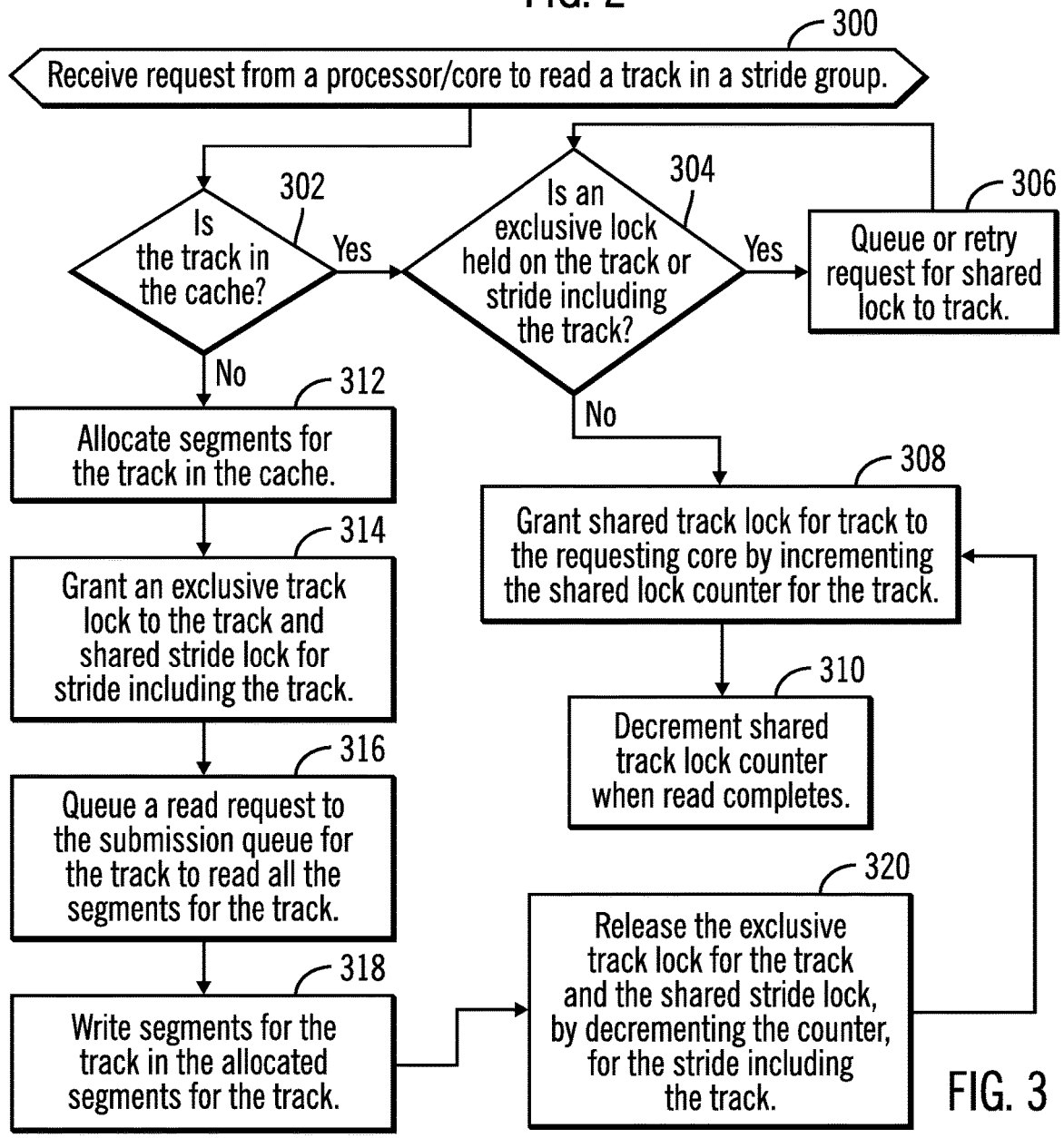
FIG. 3 illustrates an embodiment of operations to process a read request to a track in a stride group.

FIG. 3 illustrates an embodiment of operations performed by the I/O manager 122 executed by the cores $102_1$, $102_2$ ... $102_n$ to process a read request to a track in a stride group. Upon receiving (at block 300) a read from a processor/core $102_1$, $102_2$ ... $102_n$ to a track in a stride group, if (at block 302) the requested track is in the cache 106, then the I/O manager 122 determines (at block 304) whether an exclusive track lock 206 is held on the track or the stride 210 including the track. If so, then the track is being written or destaged, and the read request is queued or retried (at block 306) to obtain a shared lock to the track. If (at block 304) an exclusive track lock 206 or exclusive stride lock 210 is not held, then the shared track lock is granted (at block 308) to the requesting core $102_1$, $102_2$ ... $102_n$ by incrementing the shared track lock counter 208 for the track. The shared track lock counter 208 is decremented (at block 310) when the read completes.

If (at block 302) the requested track is not in the cache 106, then the I/O manager 122 allocates (at block 312) segments for the requested track in the cache 106 and grants (at block 314) an exclusive track lock 206 for the requested track and a shared stride lock, by incrementing the shared stride lock counter 212, for the stride including the track to stage. A read request is queued (at block 316) in the submission queue 118 to read the segments for the requested track. In NVMe implementations, an NVMe driver of the storage controller 100 may write to a submission queue doorbell 126 over the fabric 114, or a bus interface, to signal the controller 124 that there is an I/O request to process in the submission queue 118 for the core $102_i$ initiating the read request. The controller 124 may write (at block 318) segments for the track in the allocated segments for the track in the cache 106. The controller 124 also writes complete to the completion queue 120 for the core $102_i$ initiating the request to signal the read has completed. The I/O manager 122 may then release (at block 320) the locks held for the track to stage by releasing the track lock 206 for the requested track and release the shared stride lock, by decrementing the shared stride lock counter 212, for the stride including the track to stage. After releasing the locks held for the stage process, control may proceed to block 308 to allow the initiating core $102_i$ to read the track from the cache 106.

With the embodiment of FIG. 3, an exclusive track lock 206 and shared stride lock are held for a track and stride group including the track to stage into cache for a read request before the track can be written or destaged. Described embodiments provide improvements to computer technology by allowing reads to occur to tracks while different cores may be concurrently writing to different tracks in a stride group or the track is in a stride group being destaged. Further, in certain embodiments, a destage to a stride group may be allowed to proceed while there are pending reads to tracks in the stride group. The described embodiments provide locks, data structures, and functions to coordinate operations to tracks in the cache and the staging of tracks into the cache.

Figure 4:
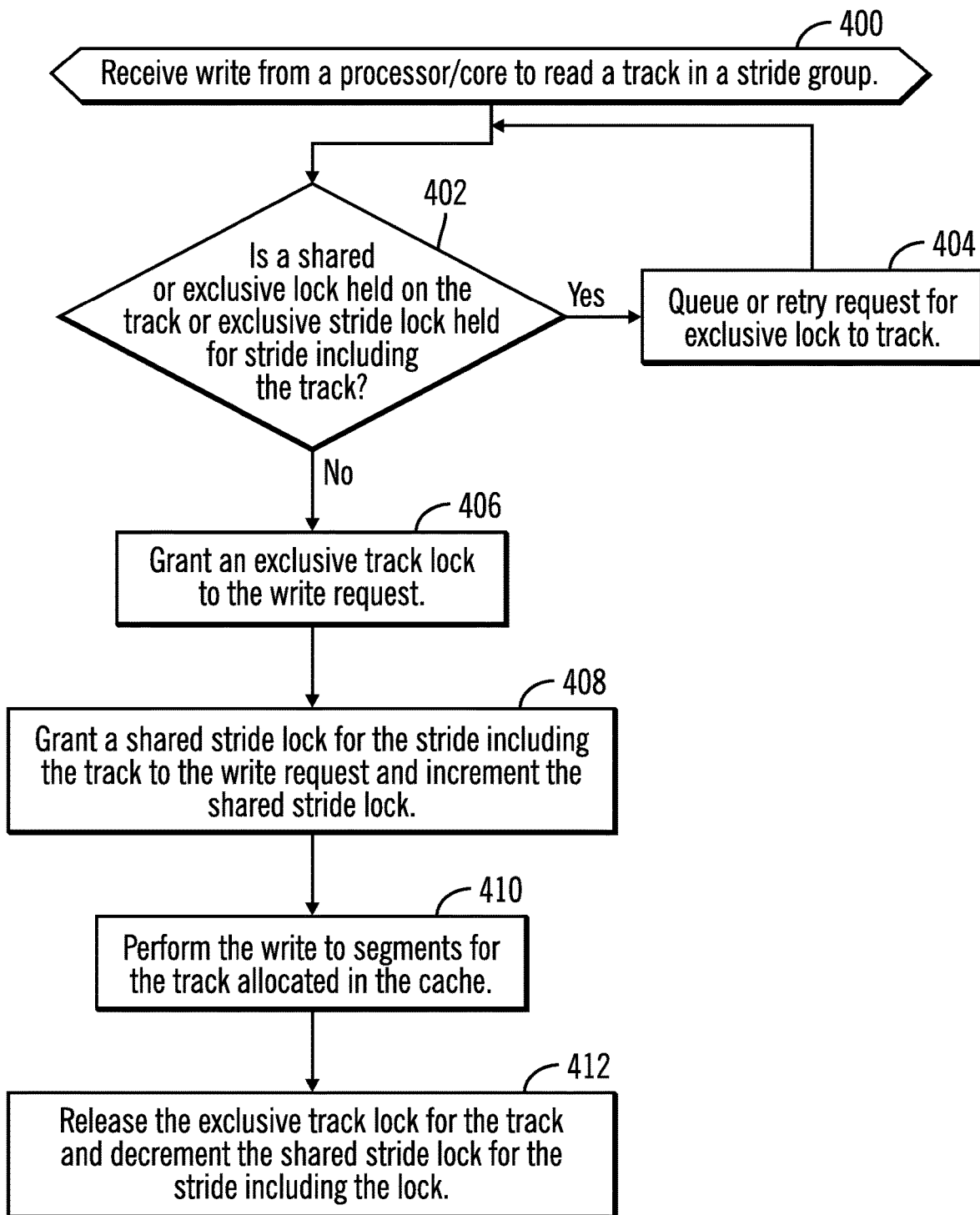
FIG. 4 illustrates an embodiment of operations to process a write request to a track in a stride group.

FIG. 4 illustrates an embodiment of operations performed by the I/O manager 122, executed by the cores $102_1$, $102_2$ ... $102_n$, to process a write request to a track in a stride group. Upon receiving (at block 400) a write from a processor/core $102_1$, $102_2$ ... $102_n$ to a track in a stride group, the I/O manager 122 determines (at block 402) whether an exclusive 206 or shared 208 track lock is held on the track or there is an exclusive stride lock 210 held on the stride group $200_i$ including the track to write. If so, then the track is being read, written or destaged, and the write request is queued or retried (at block 404) to obtain an exclusive lock 206 on the track. If (at block 402) an exclusive 206/shared 208 track lock or exclusive stride lock 210 is not held, then the exclusive track lock 206 is granted (at block 406) to the requesting core $102_1$, $102_2$ ... $102_n$ and a shared stride lock is granted (at block 408) by incrementing the shared stride lock counter 212 for the stride group including the track to write. The write is then performed (at block 410) to the track allocated in the cache 106. Upon completing the write, the exclusive track lock 206 is released (at block 412) and the shared stride lock is released by decrementing the shared stride lock counter 212.

With the embodiment of FIG. 4, an exclusive track lock and shared stride lock are held for a track and stride group including the track to write to prevent the track from being read or a stride group including the track being destaged while the track is being written in the cache 106. Described embodiments provide improvements to computer technology by allowing writes to simultaneously occur to tracks while different cores are concurrently writing to the tracks in a stride group and to coordinate the destaging of the stride group with the write operations by not initiating a write to a track subject to a pending write or in a stride group being destaged. Further, the described lock embodiments prevent a destage from proceeding while there are pending writes to tracks in the stride group, as indicated by shared stride locks being held, which is indicated by the shared stride lock counter 212 being greater than zero.

Figure 5:
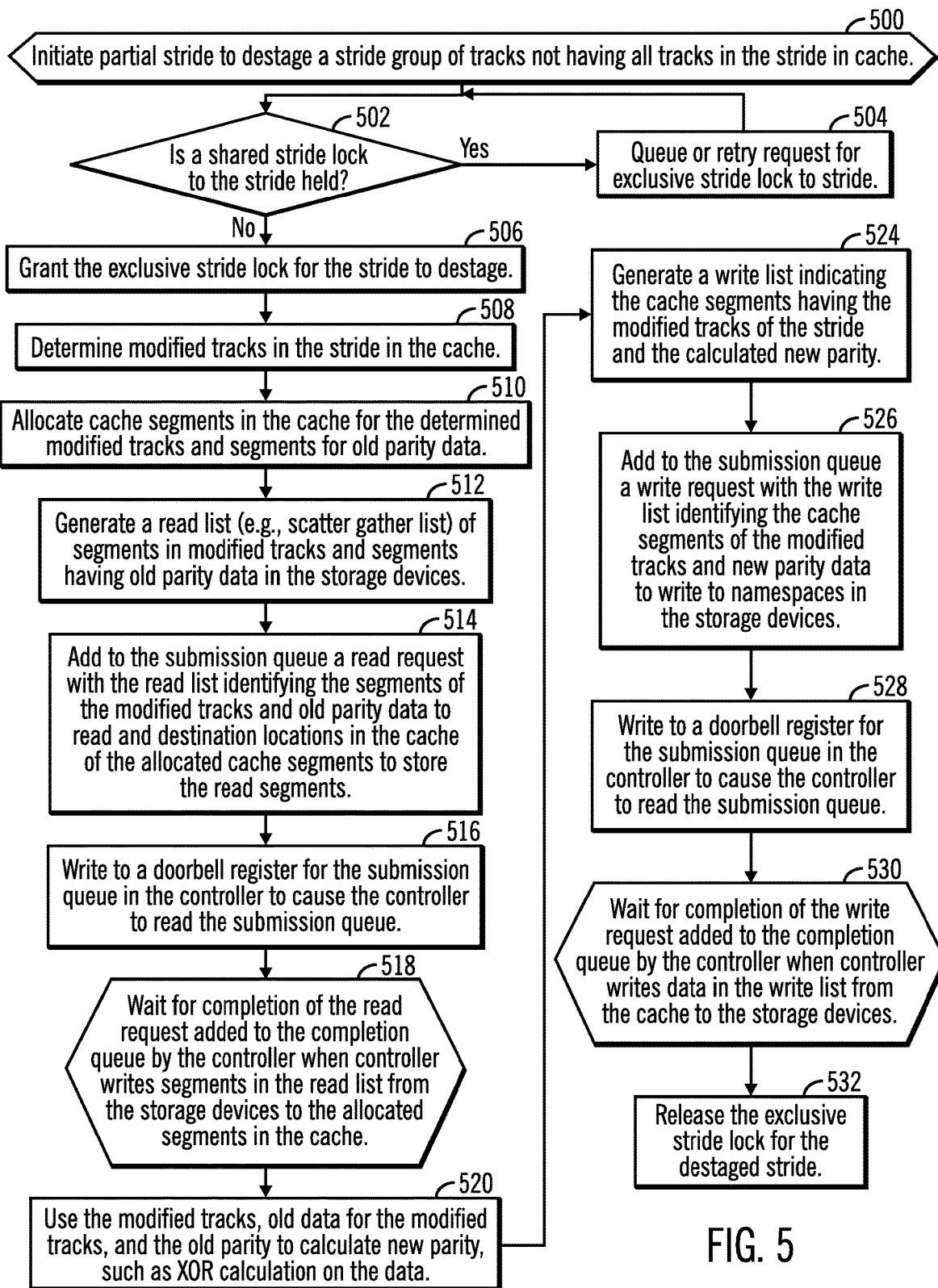
FIG. 5 illustrates an embodiment of operations to perform a partial stride destage of tracks in a stride group.

FIG. 5 illustrates an embodiment of operations performed by the I/O manager 122, executed by the cores $102_1$, $102_2$ ... $102_n$, to destage a partial stride group having less than all the tracks in the stride group in the cache 106. The I/O manager 122 may initiate (at block 500) the destage operation by using a selection algorithm to select a stride group to destage, such as Wise Order Writing (WOW) or other suitable stride group selection techniques known in the art. If (at block 502) a shared stride lock is held for the stride group, as indicated by the shared stride lock counter 212 being greater than zero, then the destage request is queued or retried (at block 504) until the exclusive stride lock 210 can be granted. If (at block 502) a shared stride lock is not held for the stride group to destage, i.e., the shared stride lock counter 212 is zero, then the I/O manager 122 grants (at block 506) the exclusive stride lock 210 for the stride group to destage. A determination is made (at block 508) of modified tracks in the stride group in the cache 106. Cache segments are allocated (at block 510) in the cache 106 for the determined modified tracks and for the old parity data to be available to stage in the pre-modified version of the modified tracks and the old parity data from the storage devices 108. The I/O manager may generate (at block 512) a read list of segments in the modified tracks and segments having the old parity data in the storage devices 108 to stage into the allocated cache segments. In NVMe implementations, the read list may comprise a scatter gather list (SGL) or Physical Region Space (PRP) list indicating the segments to read into the cache 106 from the storage devices 108. The I/O manager 122 adds (at block 514) to the submission queue 118, for the core $102_i$ performing the destage operation, a read request (or multiple read requests) with the read list, identifying the segments of the modified tracks and old parity data to read, and destination locations in the cache 106 of the allocated cache segments to store the read segments. The I/O manager 122 writes (at block 516) to the doorbell register, submission queue doorbell 126, to signal the controller 124 to read the submission queue 118 to which the read request was added.

Upon the controller 124 adding (at block 518) completion to the completion queue 120 of the core $102_i$ performing the destage after the controller 124 writes the segments in the read list from the storage devices 108 to the allocated cache segments in the cache 106, the I/O manager 122 uses (at block 520) the modified tracks, old data for the modified tracks, and the old parity to calculate new parity, such as by an XOR calculation on the data performed during a read-modify-write to update parity. After updating the parity, the I/O manager 122 generates (at block 524) a write list, e.g., a scatter gather list or PRP list for NVMe implementations, indicating the cache 106 segments having the modified tracks of the stride group to destage and the calculated new parity. The I/O manager 122 adds (at block 526) to the submission queue 118 a write request (or multiple write requests) with the write list identifying the cache segments of the modified tracks and the new parity data to write to namespaces 130 in the storage devices 108. The I/O manager 122 writes (at block 528) to the doorbell register, submission queue doorbell 126, to signal the controller 124 to read the submission queue 118 to which the write request was added.

Upon the controller 124 adding (at block 530) completion to the completion queue 120 of the core $102_i$ performing the destage after the controller 124 writes the segments in the cache 106 indicated in the write list to the destination locations of the storage devices 108, the I/O manager 122 releases (at block 532) the exclusive stride lock 210 for the destaged stride.

With the embodiment of FIG. 5, an exclusive stride lock is held for a stride group to destage to prevent the track from being read or written while the track is being destaged, although pending reads may continue during the destage operation. Described embodiments provide improvements to computer technology for destaging a partial stride group by preventing writes and reads to be initiated during the destage operation and staging in the pre-modified version of segments for the modified tracks to use to update the parity when not all the tracks for the stride group to destage are in the cache. While there are pending writes to tracks in the stride group, as indicated by shared stride locks being held, which is indicated by the shared stride lock counter 212 being greater than zero.

Figure 6:
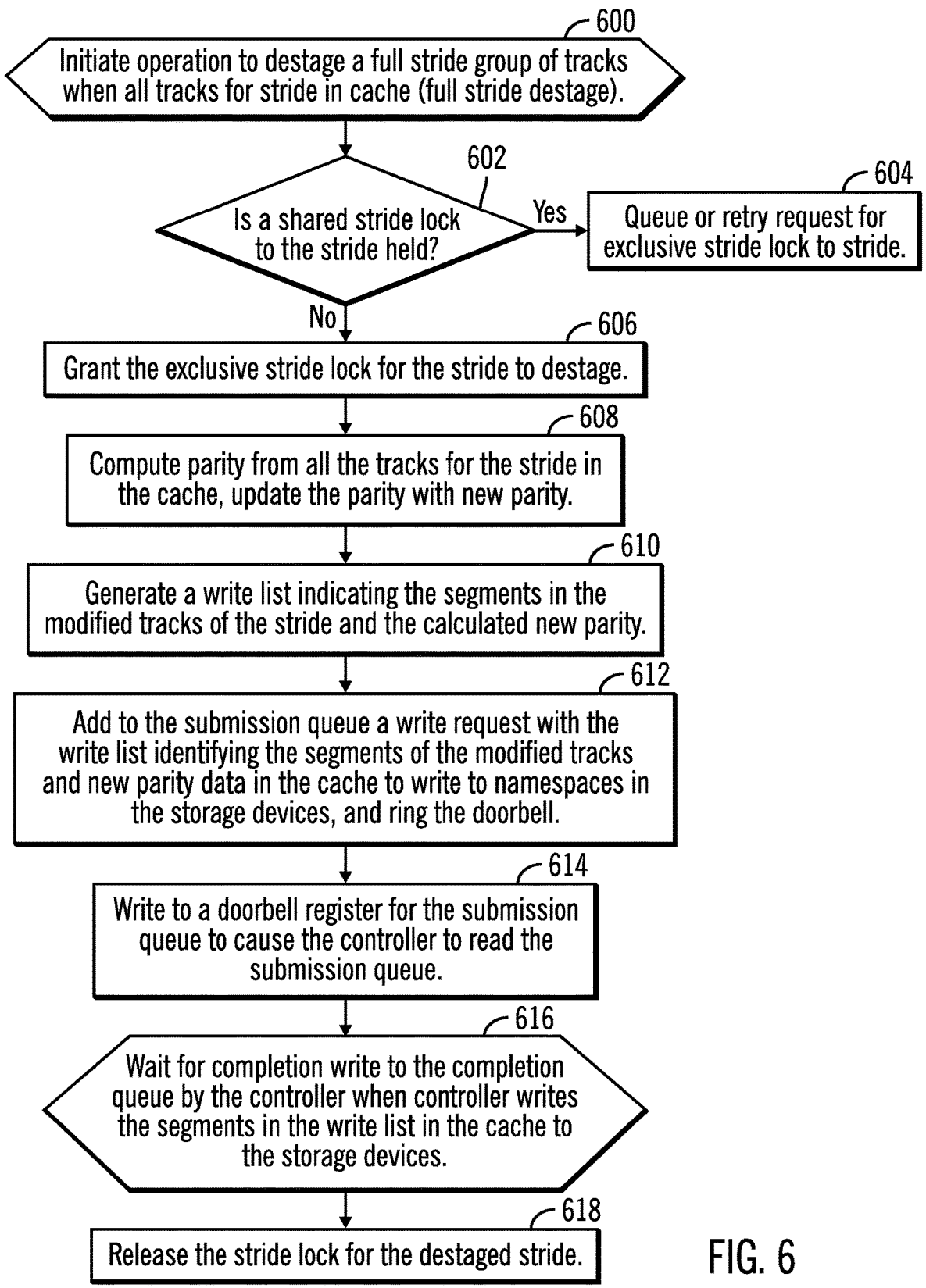
FIG. 6 illustrates an embodiment of operations to perform a full stride destage of tracks in a stride group.

FIG. 6 illustrates an embodiment of operations performed by the I/O manager 122, executed by the cores $102_1$, $102_2$ . . . $102_n$, to destage a full stride group when all the tracks for the stride group, including modified tracks, are in the cache 106. The I/O manager 122 may initiate (at block 600) the destage operation by using a selection algorithm to select a stride group to destage, such as Wise Order Writing (WOW) or other suitable stride group selection techniques known in the art. If (at block 602) a shared stride lock is held for the stride group, as indicated by the shared stride lock counter 212 being greater than zero, then the destage request is queued or retried (at block 604) until the exclusive stride lock 210 can be granted. If (at block 602) a shared stride lock is not held for the stride group to destage, i.e., the shared stride lock counter 212 is zero, then the I/O manager 122 grants (at block 606) the exclusive stride lock 210 for the stride group to destage. The I/O manager 122 then computes (at block 608) parity from all the tracks for the stride in the cache 106, and updates the parity with the new parity.

The I/O manager 122 generates (at block 610) a write list indicating the segments in the modified tracks of the stride and the calculated new parity. The I/O manager 122 adds (at block 612) to the submission queue 118 a write request with the write list identifying the cache segments of the modified tracks and the new parity data to write to namespaces in the storage devices 108. The I/O manager 122 writes (at block 614) to the submission queue doorbell 126 to signal the controller 124 to read the submission queue 118 to which the write request was added.

Upon the controller 124 adding (at block 616) completion to the completion queue 120 of the core $102_i$ performing the destage after the controller 124 writes the segments in the cache 106 indicated in the write list to the destination locations of the storage devices 108, the I/O manager 122 releases (at block 618) the exclusive stride lock 210 for the destaged stride.

With the embodiments of FIGS. 5 and 6, an exclusive stride lock is held for a stride group to destage to prevent the track from being read or written while the track is being destaged, although pending reads may continue during the destage operation. Described embodiments provide improvements to computer technology for destaging a partial or full stride group by preventing writes and reads to be initiated during the destage operation and staging in the pre-modified version of segments for the modified tracks to use to update the parity when not all the tracks for the stride group to destage are in the cache.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
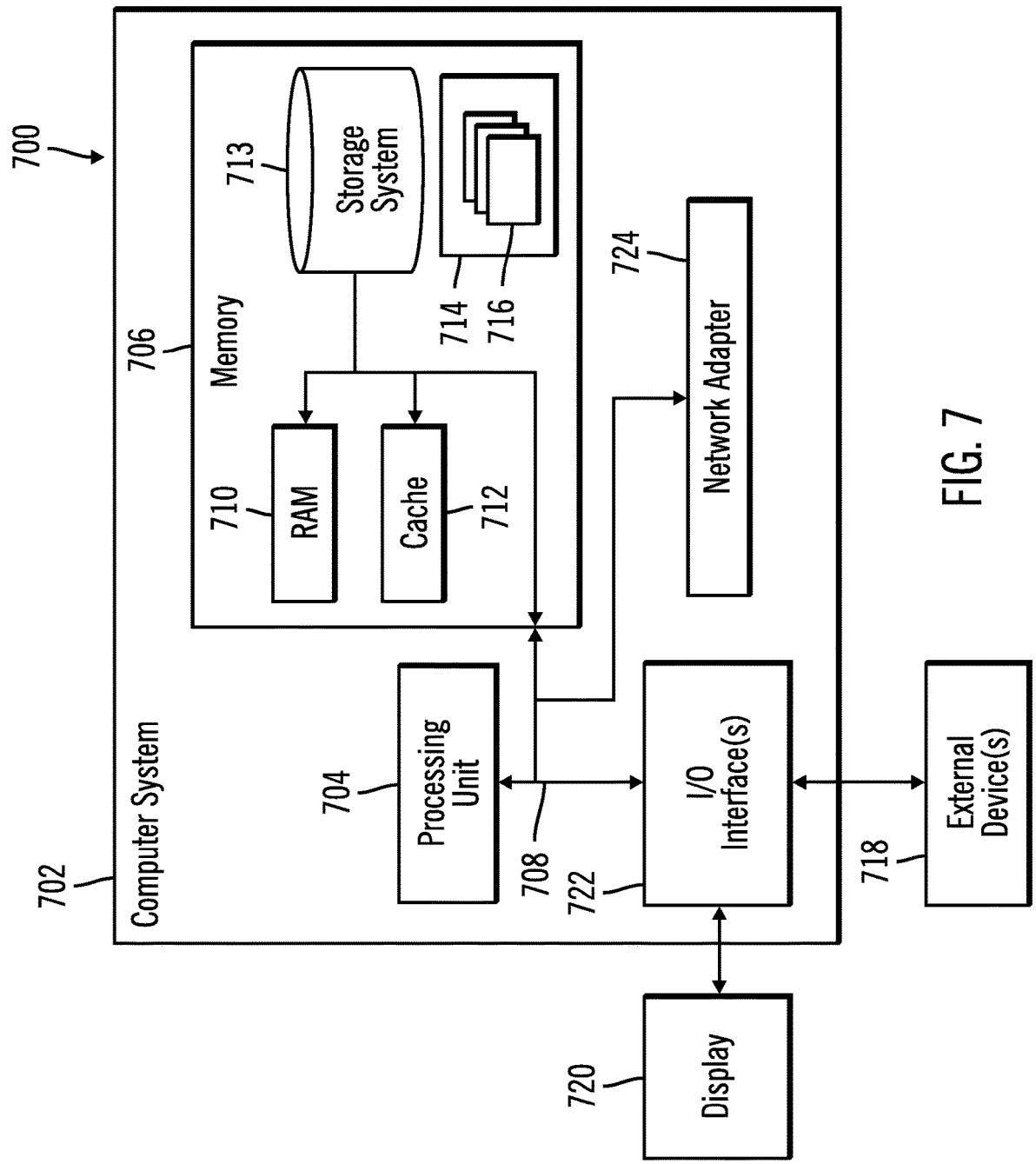
FIG. 7 illustrates a computing environment in which the components of FIG. 1 may be implemented.

The computational components of FIG. 1, including the storage controller 100 and subsystem 112 may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing Input/Output requests to a plurality of storage devices, the computer program product comprising a computer readable storage medium having computer readable program code embodied therein that is executable to perform operations, the operations comprising:
   storing in cache a group of tracks that are stored in the storage devices;
   granting exclusive track locks for tracks in the group in the cache for writes to the tracks in the group in the cache, wherein each track in the group has an exclusive track lock and a shared track lock counter indicating a number of shared track locks granted for the track, wherein exclusive track locks can be simultaneously held for writes to different tracks in the group in the cache, and wherein the group of tracks has an exclusive group lock and a shared group lock counter indicating a number of shared group locks that have been granted;
   granting an exclusive group lock for the group of tracks in the cache to destage the tracks in the group from the cache to the storage devices when the shared group lock counter for the group of tracks indicates there are no shared group locks granted for the group of tracks; and
   releasing the exclusive group lock in response to completing the destage of the tracks in the group in the cache to the storage devices.

2. The computer program product of claim 1, wherein the operations further comprise:
   receiving a write to a target track in the group;
   determining whether the exclusive group lock for the group is held;
   granting an exclusive track lock to the target track in response to determining that the exclusive group lock is not held; and retrying to access the exclusive track lock for the target track in response to determining that the exclusive group lock is held.

3. The computer program product of claim 1, wherein the operations further comprise:
granting shared group locks for writes to the tracks in the group in the cache;
releasing a shared group lock for a write in response to completing the write to a track in the cache; and
determining whether any shared group locks are held in response to initiating the destage of the group of tracks, wherein the exclusive group lock is only granted in response to determining that there are no shared group locks held for the group to destage.

4. The computer program product of claim 1, wherein the destage of the group of tracks further comprises:
determining modified data in tracks in the group in the cache;
generating a read request to add to a submission queue indicating read data for the modified data and old parity data for the group to read from at least one of the storage devices to stage into the cache;
calculating new parity data using the read data for the modified data and the old parity data staged into the cache; and
writing the new parity data and the modified data in the cache to the at least one of the storage devices, wherein the exclusive group lock is released in response to completing of the writing of the new parity data and the modified data to the at least one of the storage devices.

5. The computer program product of claim 4, wherein the writing the new parity data and the modified data comprises:
generating a write request to add to the submission queue indicating data for the modified data and the new parity data in the cache to transfer from the cache to the at least one of the storage devices.

6. The computer program product of claim 5, wherein the computer readable program code is executed by a system including the computer readable storage medium, wherein the system is coupled to a controller that interfaces with the storage devices, wherein the operations further comprise:
setting a doorbell register for the submission queue when adding the read request and the write request to the submission queue, wherein the setting of the doorbell register signals to the controller to process the read request to transfer data from the at least one of the storage devices to the cache and to process the write request to transfer modified data and the new parity data from the cache to the at least one of the storage devices.

7. The computer program product of claim 4, wherein the generating the read request comprises:
determining modified segments of tracks in the group;
allocating cache segments in the cache for the determined modified segments and segments for old parity data; and
generating a list indicating the segments for the modified data and the old parity data and destination locations in the cache for the allocated cache segments, wherein the list is provided with the read request to use to determine the read data to read from the at least one of the storage devices to write to the destination locations in the cache.

8. The computer program product of claim 1, wherein the destaging the tracks further comprises:
determining that all the tracks for the group are in the cache;
computing new parity data for the group from the tracks for the group in the cache; and
generating a write request to add to a submission queue including a list indicating modified tracks for the group in the cache and the new parity data and destination locations in the at least one of the storage devices to write the modified tracks and the new parity data, wherein a controller accesses the write request in the submission queue and the list and accesses the read data for the modified tracks and the new parity data indicated in the list and writes across the at least one of the storage devices indicated as destination locations in the list.

9. The computer program product of claim 1, wherein the operations further comprise:
initiating operations to stage data for a track from at least one of the storage devices into the cache;
allocating segments in the cache for data to stage;
granting an exclusive track lock on the allocated segments in the cache for the data to stage and the exclusive group lock for the group including the track to stage;
adding a read request to a submission queue indicating the data for the track to stage into the cache;
storing the data from the read request in the allocated segments in the cache; and
releasing the exclusive track lock on the segments in the cache and the exclusive group lock for the group including the track to stage in response to completing reading of the data for the segments in the cache.

10. A computer program product for managing Input/Output requests to tracks in a cache stored in a plurality of storage devices, the computer program product comprising a computer readable storage medium having computer readable program code embodied therein that when executed by a plurality of processing cores performs operations, the operations comprising:
providing for each track in a stride group of tracks an exclusive track lock and a shared track lock indicating a number of shared track locks granted for the track;
granting shared stride locks to writes to tracks in the stride group of tracks, wherein the shared stride locks are granted to writes simultaneously writing to different tracks in the stride group;
granting an exclusive track lock for each of the tracks to write in the stride group;
determining whether a shared stride lock counter indicates whether there are outstanding shared stride locks for writes in response to a destage request to destage the stride groups of tracks; and
granting an exclusive stride lock for a destage of a stride group of tracks from the cache to the storage devices in response to determining there are no outstanding shared stride locks for writes.

11. The computer program product of claim 10, wherein the operations further comprise:
communicating with a controller managing access to the storage devices over a fabric;
adding read requests to at least one submission queue to stage tracks from the storage devices into the cache to return for read requests to the tracks, wherein the controller retrieves the read requests from the at least one submission queue over the fabric to read data from the storage devices to write to the cache; and
adding write requests to the at least one submission queue to write the tracks to destage for the stride group in response to receiving the exclusive stride lock for the stride group, wherein the controller retrieves the write requests from the at least one submission queue over the fabric to write data to the storage devices.

12. A system for managing Input/Output requests to a plurality of storage devices, comprising:
at least one processor; and
a computer readable storage medium having computer readable program code embodied that when executed by the at least one processor performs operations, the operations comprising:
storing in cache a group of tracks that are stored in the storage devices;
granting exclusive track locks for tracks in the group in the cache for writes to the tracks in the group in the cache, wherein each track in the group has an exclusive track lock and a shared track lock counter indicating a number of shared track locks granted for the track, wherein exclusive track locks can be simultaneously held for writes to different tracks in the group in the cache, and wherein the group of tracks has an exclusive group lock and a shared group lock counter indicating a number of shared group locks that have been granted;
granting an exclusive group lock for the group of tracks in the cache to destage the tracks in the group from the cache to the storage devices when the shared group lock counter for the group of tracks indicates there are no shared group locks granted for the group of tracks; and
releasing the exclusive group lock in response to completing the destage of the tracks in the group in the cache to the storage devices.

13. The system of claim 12, wherein the operations further comprise:
receiving a write to a target track in the group;
determining whether the exclusive group lock for the group is held;
granting an exclusive track lock to the target track in response to determining that the exclusive group lock is not held; and
retrying to access the exclusive track lock for the target track in response to determining that the exclusive group lock is held.

14. The system of claim 12, wherein the operations further comprise:
granting shared group locks for writes to the tracks in the group in the cache;
releasing a shared group lock for a write in response to completing the write to a track in the cache; and
determining whether any shared group locks are held in response to initiating the destage of the group of tracks, wherein the exclusive group lock is only granted in response to determining that there are no shared group locks held for the group to destage.

15. The system of claim 12, wherein the destage of the group of tracks further comprises:
determining modified data in tracks in the group in the cache;
generating a read request to add to a submission queue indicating read data for the modified data and old parity data for the group to read from at least one of the storage devices to stage into the cache;
calculating new parity data using the read data for the modified data and the old parity data staged into the cache; and
writing the new parity data and the modified data in the cache to the at least one of the storage devices, wherein the exclusive group lock is released in response to completing of the writing of the new parity data and the modified data to the at least one of the storage devices.

16. The system of claim 15, wherein the writing the new parity data and the modified data comprises:
generating a write request to add to the submission queue indicating data for the modified data and the new parity data in the cache to transfer from the cache to the at least one of the storage devices.

17. The system of claim 15, wherein the generating the read request comprises:
determining modified segments of tracks in the group;
allocating cache segments in the cache for the determined modified segments and segments for old parity data; and
generating a list indicating the segments for the modified data and the old parity data and destination locations in the cache for the allocated cache segments, wherein the list is provided with the read request to use to determine the read data to read from the at least one of the storage devices to write to the destination locations in the cache.

18. A system for managing Input/Output requests to a plurality of storage devices, comprising:
a plurality of processing cores; and
a computer readable storage medium having computer readable program code embodied that when executed by the processing cores performs operations, the operations comprising:
providing for each track in a stride group of tracks an exclusive track lock and a shared track lock indicating a number of shared track locks granted for the track;
granting shared stride locks to writes to tracks in the stride group of tracks, wherein the shared stride locks are granted to writes simultaneously writing to different tracks in the stride group;
granting an exclusive track lock for each of the tracks to write in the stride group;
determining whether a shared stride lock counter indicates whether there are outstanding shared stride locks for writes in response to a destage request to destage the stride groups of tracks to a cache; and
granting an exclusive stride lock for a destage of a stride group of tracks from the cache to the storage devices in response to determining there are no outstanding shared stride locks for writes.

19. The system of claim 18, wherein the operations further comprise:
communicating with a controller managing access to the storage devices over a fabric;
adding read requests to at least one submission queue to stage tracks from the storage devices into the cache to return for read requests to the tracks, wherein the controller retrieves the read requests from the at least one submission queue over the fabric to read data from the storage devices to write to the cache; and
adding write requests to the at least one submission queue to write the tracks to destage for the stride group in response to receiving the exclusive stride lock for the stride group, wherein the controller retrieves the write requests from the at least one submission queue over the fabric to write data to the storage devices.

20. A method for managing Input/Output requests to a plurality of storage devices, comprising:
storing in cache a group of tracks that are stored in the storage devices;
granting exclusive track locks for tracks in the group in the cache for writes to the tracks in the group in the cache, wherein each track in the group has an exclusive track lock and a shared track lock counter indicating a number of shared track locks granted for the track, wherein exclusive track locks can be simultaneously held for writes to different tracks in the group in the cache, and wherein the group of tracks has an exclusive group lock and a shared group lock counter indicating a number of shared group locks that have been granted;

granting an exclusive group lock for the group of tracks in the cache to destage the tracks in the group from the cache to the storage devices when the shared group lock counter for the group of tracks indicates there are no shared group locks granted for the group of tracks; and releasing the exclusive group lock in response to completing the destage of the tracks in the group in the cache to the storage devices.

21. The method of claim 20, further comprising:

receiving a write to a target track in the group;

determining whether the exclusive group lock for the group is held;

granting an exclusive track lock to the target track in response to determining that the exclusive group lock is not held; and retrying to access the exclusive track lock for the target track in response to determining that the exclusive group lock is held.

22. The method of claim 20, further comprising:

granting shared group locks for writes to the tracks in the group in the cache;

releasing a shared group lock for a write in response to completing the write to a track in the cache; and determining whether any shared group locks are held in response to initiating the destage of the group of tracks, wherein the exclusive group lock is only granted in response to determining that there are no shared group locks held for the group to destage.

23. The method of claim 20, wherein the destage of the group of tracks further comprises:

determining modified data in tracks in the group in the cache;

generating a read request to add to a submission queue indicating read data for the modified data and old parity data for the group to read from at least one of the storage devices to stage into the cache;

calculating new parity data using the read data for the modified data and the old parity data staged into the cache; and writing the new parity data and the modified data in the cache to the at least one of the storage devices, wherein the exclusive group lock is released in response to completing of the writing of the new parity data and the modified data to the at least one of the storage devices.

24. The method of claim 23, wherein the writing the new parity data and the modified data comprises:

generating a write request to add to the submission queue indicating data for the modified data and the new parity data in the cache to transfer from the cache to the at least one of the storage devices.

25. The method of claim 23, wherein the generating the read request comprises:

determining modified segments of tracks in the group;

allocating cache segments in the cache for the determined modified segments and segments for old parity data; and generating a list indicating the segments for the modified data and the old parity data and destination locations in the cache for the allocated cache segments, wherein the list is provided with the read request to use to determine the data to read from the at least one of the storage devices to write to the destination locations in the cache.

* * * * *